United States Patent [19]

Cavanagh

[11] Patent Number: 4,719,668

[45] Date of Patent: Jan. 19, 1988

[54] ROPE CINCHING DEVICE

[76] Inventor: Roland R. Cavanagh, 13716 Skyline Boulevard, Woodside, Calif. 94062

[21] Appl. No.: 907,476

[22] Filed: Sep. 15, 1986

[51] Int. Cl.$^4$ ............................................. F16G 11/14
[52] U.S. Cl. ...................................... 24/68 F; 24/130
[58] Field of Search ............ 410/100; 24/130, 129 R, 24/129 A, 129 B, 129 D, 115 H, 115 J, 68 R, 68 CD, 68 F, 71.1, 71.3

[56]  References Cited

U.S. PATENT DOCUMENTS

| 322,501 | 7/1885 | Taylor | 24/129 R |
|---|---|---|---|
| 446,020 | 2/1891 | Seelbach | 24/129 R |
| 465,577 | 12/1891 | Kiefer | 24/130 |
| 1,083,958 | 1/1914 | Tod | 24/129 R |
| 1,249,371 | 12/1917 | Freeberg | 24/130 |
| 1,524,108 | 1/1925 | Rowland | 24/129 R |
| 2,450,358 | 9/1948 | Romano | 24/130 X |
| 3,574,900 | 4/1971 | Emery . | |
| 3,715,782 | 2/1973 | Newll . | |
| 3,988,810 | 11/1976 | Emery . | |
| 4,120,077 | 10/1978 | Fink . | |
| 4,373,463 | 2/1983 | Beaudette . | |

FOREIGN PATENT DOCUMENTS

| 2517740 | 11/1976 | Fed. Rep. of Germany | 24/129 R |
|---|---|---|---|
| 30374 | 3/1909 | Sweden | 24/129 R |
| 22334 | of 1912 | United Kingdom | 24/129 R |
| 457330 | 11/1936 | United Kingdom | 24/129 B |

Primary Examiner—Kenneth J. Dorner
Assistant Examiner—James R. Brittain
Attorney, Agent, or Firm—Flehr, Hohbach, Test, Albritton & Herbert

[57]  ABSTRACT

A cinching device for tensioning and securing a line across a cargo load is disclosed which has a body formed with a sinuous guideway providing a first jam cleat so that frictional engagement between the line and the body increases as the line is drawn taut in the body of the device to secure the device to the line. An arcuate guide surface is formed in the body proximate the first jam cleat to permit movement of the line over the guide surface so that the line may be looped over an external anchor and pulled against the anchor and the first jam cleat to provide a mechanical advantage which is used to tension the line. The body of the cinching device also has a second jam cleat to receive and secure the line after it has been pulled taut by using the mechanical advantage inducing arcuate guide surface.

4 Claims, 4 Drawing Figures

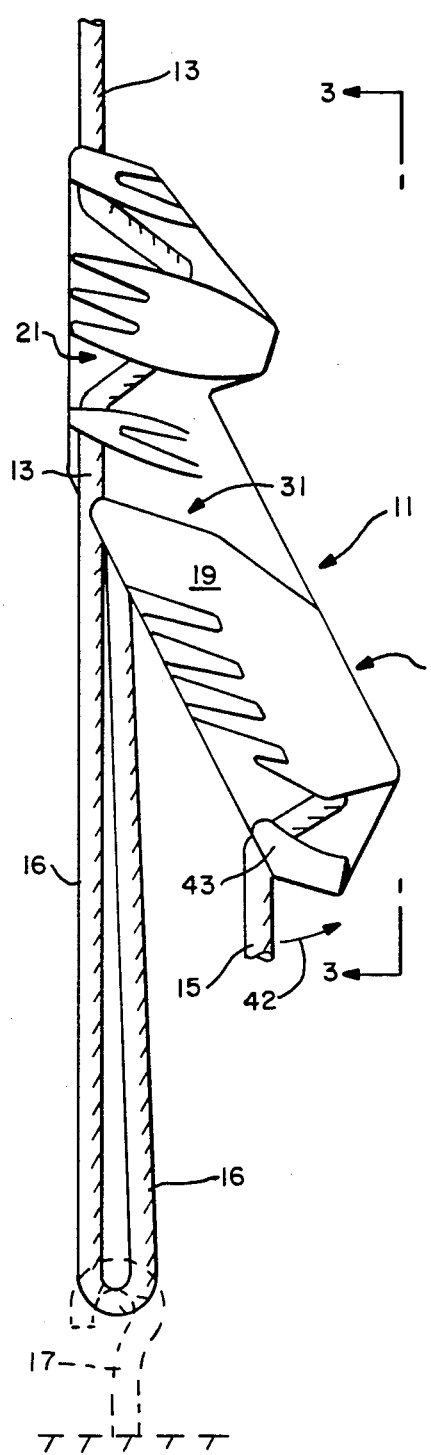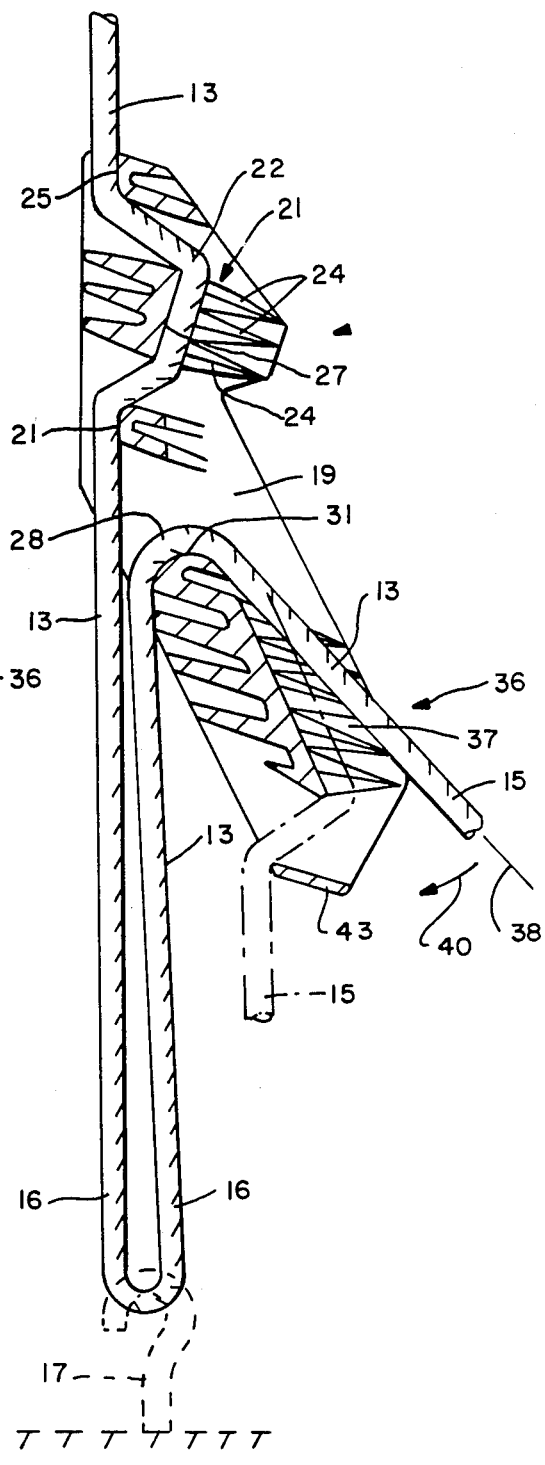
FIG.—1  FIG.—2

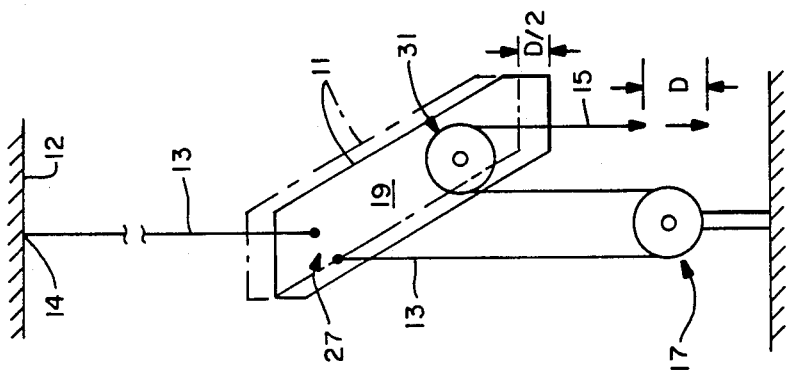
FIG.—4
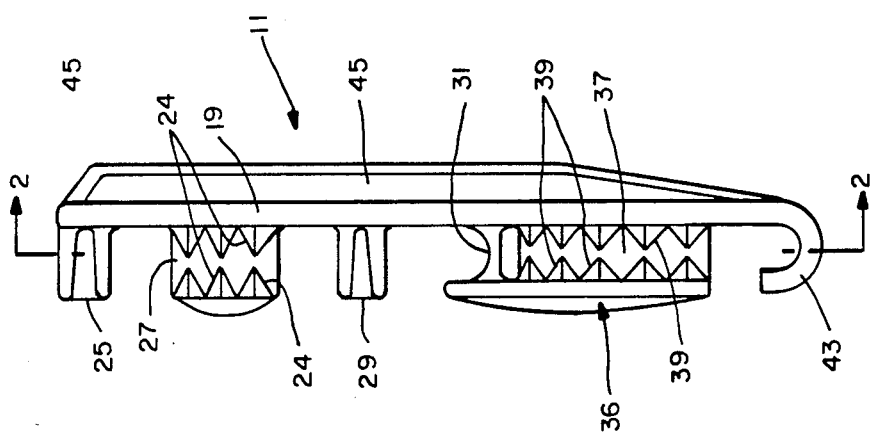
FIG.—3

ROPE CINCHING DEVICE

BACKGROUND OF THE INVENTION

1. Field of the Invention

The present invention generally relates to a cinching device for tensioning a flexible line, such as a rope and, more particularly, the present invention relates to a cinching device specially adapted for tensioning a rope across a cargo load and the like.

2. State of the Art

Open bed cargo trucks and trailers typically have a plurality of hook-like or eye-like members fixed about the peripheries of their beds. The hook-like members provide anchor means so that lines, such as ropes or the like, may be extended from one side of the bed to the other to hold a cargo load in place. When a load is secured with such cargo lines, the lines must be taut to prevent shifting or other movement of the load. If a line loosens during transport of a load, the cargo may shift or fall from the truck or trailer and be damaged, with possible attendant injury to other vehicles, persons or property.

When a load is to be secured to a cargo bed by means of a line, the usual procedure for fastening the line includes passing the free end of the line through one of the securement hooks and then pulling the line taut against the hook until the line can be tied off. Often a line is tied with a knot known as a "trucker's knot," which also can be used to cinch the line down against the cargo. Such securement of a cargo load by means of lines requires dexterity and strength on the part of the trucker, and if several lines are required across a load, substantial time may be expended re-tying knots in order to reach a condition in which all lines are taut.

Mechanical rope cinching devices have been developed which are particularly well suited for use with wire rope and chain. Such mechanical rope cinching apparatus, however, are somewhat costly and tedious to use, particularly when considering the number of devices that can be required to secure a load on a large truck or trailer. On some trailers, mechanical rope cinching mechanisms, such as winches, are built into the side of the trailer, but again the cost of such mechanisms, as original equipment or when retro-fit, can be significant.

Additionally, various jam cleat assemblies have been devised and employed in connection with securement of the ends of a cargo-securement rope. Typical of such securement devices is the assembly of U.S. Pat. No. 4,373,463. Jam cleats are usually fixed to the bed of the trailer or truck, with tensioning of the line still being dependent on the trucker's strength. After tensioning the line is merely jammed into the cleat structure. The cleat itself does not afford the user any mechanical advantage during tensioning of the line.

Similarly, U.S. Pat. Nos. 4,120,077; 3,988,810; 3,715,782; and 3,574,900 disclose various jam cleat devices which can be used to secure a line or rope, but which afford the user no mechanical advantage when tensioning the line.

OBJECTS, ADVANTAGES AND SUMMARY OF THE INVENTION

In view of the state of the art, an object and advantage of the present invention is to provide a device for conveniently and rapidly tensioning and securing the end of a line, such as a rope, across a cargo load.

More particularly, an object and advantage of the present invention is to provide a practical cinching device for tensioning a rope or the like across a cargo load which provides a mechanical advantage and permits a user to fasten the rope without releasing either hand from the rope.

In the preferred embodiment of the present invention, a cinching device comprises, briefly, a body having a first line securement structure such as a sinuous guideway to slidably receive a line, the guideway being shaped such that frictional engagement between the line and the body increases as the line is drawn taut to secure the body to the line. The body of the cinching device further includes an arcuate guide surface to receive the line following the sinuous guideway and following a loop of the line which extends away from the body and around an external anchor such as a hook. The guide surface is formed and positioned to provide the mechanical advantage when the free end of the line is pulled over the guide surface and around the external anchor and against the sinuous guideway in the body which secures the line. Finally, the body of the cinching device includes means formed in the body to receive and hold the line after it is pulled taut across the guide surface.

The foregoing and other advantages of the present invention will become clear to workers skilled in the art in view of the following description and appended drawings.

FIG. 1 is a side elevation view of a cinching device constructed according to the present invention;

FIG. 2 is a cross-sectional view of the device of FIG. 1 taken substantially along the plane of line 2—2 in FIG. 3;

FIG. 3 is an end elevation view of the device of FIG. 1 taken substantially along the plane of the line 3—3 in FIG. 1; and FIG. 4 is a schematic representation of the device of FIG. 1.

DETAILED DESCRIPTION OF THE PREFERRED EMBODIMENT

Referring to FIGS. 1, 2 and 4, a cinching device 11 is mounted to a line 13 having a free end 15 and an opposite end 14 (FIG. 4) secured to anchor means 12, such as an eye or hook. Line or rope 13 can be understood to be stretched across a cargo load on a truck or trailer bed, a pallet or the like and anchored at end 14 remote from the section of line 13 on which cinching device 11 is mounted. The purpose of cinching device 11 is to tension line 13 and to secure free end 15 of the line to a stationary anchor means, such as hook 17, to hold the load in place. Cinching device 11 includes a body 19 in which is formed with a first line securement means 21, such as a sinuous guideway for receiving rope 13. In the illustrated embodiment, first line securement means 21 is defined by three spaced-apart, line engaging, guide surfaces 25, 27 and 29 which are located such that a first section 22 of rope 13 passes across and between surfaces elements 25, 27 and 29 in a generally sinusoidal shaped path.

Before proceeding with further description of the structure of cinching device 11, the interrelationship of sinuous guideway 21 and rope 13 will be described. In the illustrated embodiment, the three spaced-apart surfaces 25, 27 and 29 are fixed to body 19 such that the direction of travel of rope 13 changes at least once by more than ninety degrees as the rope passes along sinuous guideway 21. (More particularly, the direction of travel of rope 13 changes by almost 180 degrees as rope 13 travels over and then under member 27.) As rope 13 runs in a sinusoidal-like path across surfaces 25, 27 and 29 and is placed in tension during usage of cinching device 11, the rope is pulled down against converging ribs 24 which form a jam cleat at surface 27. Thus, rope 13 is secured by members 25, 27 and 29 and ribs 24 secure the body of cinching device 11 to first section 22 of line 13.

In practice, when the tension in rope 13 exceeds about five to ten pounds, the cinching device will be held securely to rope 13. The degree of frictional engagement depends, of course, upon the type of rope or other line utilized.

Body 19 preferably is elongated and dimensioned so that it may be manually gripped. This allows the user to easily manipulate the cinching device and set the jam cleat sections to secure the rope to the cinching device.

Cinching device 11 further includes means 31 for providing a mechanical advantage for a user of the device during the rope tensioning process, and includes a second line securing means 36 for holding rope 13 in the absence of a substantial tension force. In the illustrated embodiment, the means for providing mechanical advantage is an arcuate or rounded guide 31 which is positioned on body 19 proximate first line securement means 21 to engage a second section 28 of line following or remote of first rope section 22. Mechanical advantage means 31 provides a surface against which line or rope 13 can slidably run so that the direction of travel of rope 13 can be changed by approximately 180 degrees after passage of a loop 16 of the line around anchor hook 17.

Also in the illustrated embodiment, the second line securement means 36 for securing rope 13 to body 19 comprises a generally V-shaped slot 37 formed in body 19 adjacent rounded guide surface 31 to provide a second jam cleat. As best shown in FIGS. 2 and 3, converging ribs or ridges 39 are formed on the sidewalls of V-shaped slot 37 to extend generally perpendicular to the length of the slot thereby to increase frictional engagement when rope 13 is jammed into the slot 37.

Operation of cinching device 11 will now be described. In use, remote end 14 of rope 13 is first fixedly secured or anchored to a hook or the like 12 on one side of a cargo load, then rope 13 is passed across the cargo and mounted from a side of the cinching device into sinuous guideway 21. Body 19 of device 11 is formed for passage of a loop 16 of line 13, intermediate the first line section 22 and second line section 28, around external anchor means 17. The rope then is run across rounded guide 31.

The distance between rounded guide 31 and hook 17 should be sufficient to allow substantial takeup of rope 13 during operation of cinching device 11 and tensioning of line 13. Such spacing can be easily adjusted by reason of the open side of device 11, which facilitates mounting of the device to and removal from line 13 at any position along its length. Additionally, before the line is tensioned, it can be fed axially through first securement means 21.

The next step in use of device 11 is to pull free end 15 of rope 13 across rounded guide 31 in a direction such that the rope does not run too deeply into V-shaped slot 37. Preferably, the free end of rope 13 is pulled in a direction of arrow 38 in FIG. 2. As tension is increased by pulling on free end 15, rope 13 will become taut across a load, and after slack is taken out of rope 13, cinching device 11 frictionally locks in place on first section 22 of the rope.

After cinching device 11 becomes fixedly positioned relative to rope 13, mechanical advantage is provided by rounded guide surface 31 as further tension is applied at free end 15. As best may be seen in FIG. 4, surface 31 acts like a pulley, and as rope 13 is pulled across rounded guide surface 31. The rope slides with respect to surface 31 and slides with respect to hook 17, but rope 13 is secured to cinching device 11 by securement means 21. Thus, surface 31 and hook 17 reverse the direction of the line twice, and the user pulls against securement 21 to displace body 19 toward hook 17 to thereby tension line 13 between anchor 12 and cinching device 11. The incremental distance, D, of travel of free end 15 is approximately twice the incremental travel, D/2, of cinching device 11 toward hook 17 (which also acts like a pulley). When desired tension on rope 13 is reached, rope 13 is jammed (as indicated by arrow 40 in FIG. 2) into V-shaped second line securement means or slot 37 and frictional engagement with ridges 39 holds the rope in place. Such jamming action is relatively easy to accomplish because, with substantial tension in rope 13, cinching device 11 is secured on line 13 in a substantially stationary position. When using the cinching device of the present invention, the user essentially pulls line 13 over two pulleys, one of which is carried by body 19, to achieve the mechanical advantage.

After the line has been secured in the manner described above, free end 15 of rope 13 may be passed over or even wrapped around (arrow 42 in FIG. 1) body hook 43 so that tension in rope 13 will not be lost if vibrations cause rope 13 to work free of V-shaped slot 37. Such wrapping or even tying of free end 15 is easily accomplished because of the absence of appreciable tension on free end 15 after line 13 has been secured in jam cleat means 36.

Various advantages of cinching device 11 can now be readily understood. First, the position of cinching device 11 on a rope 13 can be easily adjusted by sliding the rope through sinuous passageway 13 prior to applying tension to the rope. Second cinching device 11 provides mechanical advantage through the previously described pulley-like action and, therefore, allows a cargo-securing line to be tensioned with relatively little effort. Further, cinching device 11 permits a user to hold a cargo line with two hands while, at the same time, securing the line. In other words, the act of forcing rope 13 into V-shaped slot 37 does not require a user to release either hand from the rope 13 but, instead, only requires that a user move rope 13 toward cinching device 11 until the rope is jammed deeply into slot 37. The relative ease with which a rope can be fastened to cinching device 11 can be contrasted, for example, with the relative difficulty of tying a knot in a taut line without losing tension.

It is preferable to form body 19 as a cast body from a durable plastic or lightweight metal, and the body can be provided with a longitudinally extending reinforcing rib 45 (FIG. 3) to provide lateral rigidity.

Although the present invention has been described in terms of the preferred embodiment, workers in the art will recognize that various alternative embodiments could be utilized. Such alternative embodiments as follow the spirit and scope of the present invention are intended to be encompassed by the following claims.

What is claimed is:

1. In a cinching device for tensioning and securing a line, said device including a body having a first line securement means frictionally engaging and securing said body to said line at a first position along said line, said body further having a surface formed for and supporting a portion of said line proximate said first position for movement of said portion over said surface during cinching, and said body having a second line securement means securing said line at a second position proximate said portion and along said line on a side of said portion opposite said first portion, wherein the improvement in said cinching device comprises:

said body further being formed as an aperture-free body with channel means extending from all of said first line securement means, said surface, and said second line securement means to a side of said body for passage of a section of said line from said side of said body through said channel means and into operative engagement with each of said first line securement means, said surface, and said second line securement means;

said first line securement means and said second line securement means each being formed for and securing said line solely by frictional engagement with said body;

said first line securement means securing said line to said body during tensioning of said line by movement over said surface; and said first line securement means, said surface, and said second line securement means defining a single path for said line which constrains the held portion of said line to a plane.

2. The cinching device as defined in claim 1 wherein, said first line securement means is provided by guide members defining a sinusoidal-shaped path;
said surface is formed for and slidably supports said portion; and
said second line securement means is a jam cleat.

3. In a cinching device for tensioning and securing a line, said device including a body having a first line securement means frictionally engaging and securing said body to said line at a first position along said line, said body further having a surface formed for and supporting a portion of said line proximate said first position for movement of said portion over said surface during cinching, and said body having a second line securement means frictionally engaging and securing said line at a second positon proximate said portion and along said line on a side of said portion opposite said first position, wherein the improvement in said cinching device comprises:

said body is formed with an imperforate first side and an opposed second side;

said first line securement means extends from said first side to said second side, and said second side is formed with channel means therethrough dimensioned for passage of said line to said first line securement means;

said surface extends between said first side and said second side, and said second side is formed with channel means therethrough to said surface dimensioned for passage of said portion of said line for movable mounting on said surface;

said second line securement means extends between said first side and said second side, and said second side is formed with channel means therethrough dimensioned for passage of said line to said second line securement means; and said first line securement means, said surface, and said second line securement means defining a single path for said line constrains the held portion of said line to a plane.

4. The cinching device as defined in claim 3 wherein, said first line securement means and said second line securement means are each formed to secure said device to said rope without looping of said line for frictional engagement of a section of said line with another section of said line.

* * * * *